UNITED STATES PATENT OFFICE.

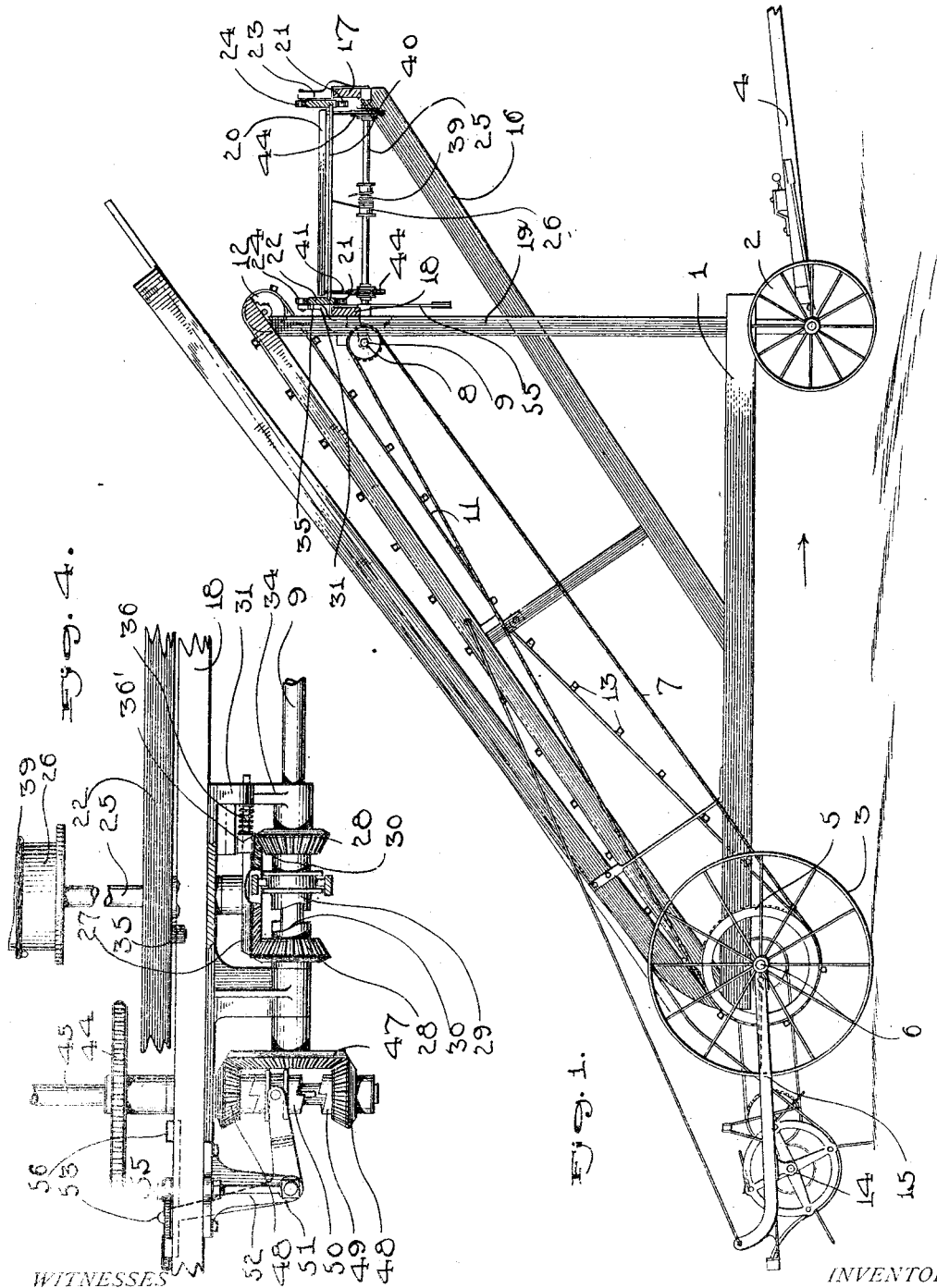

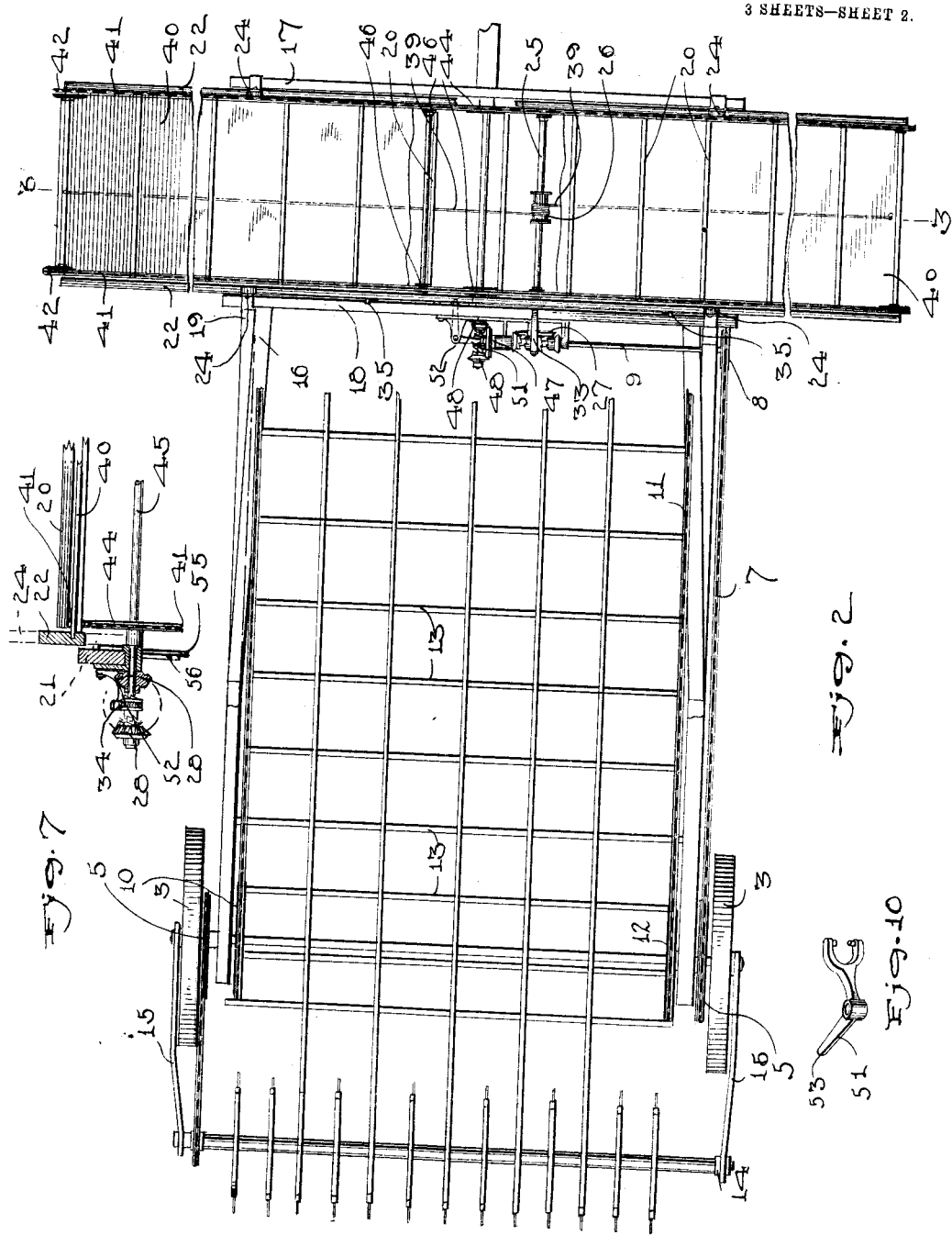

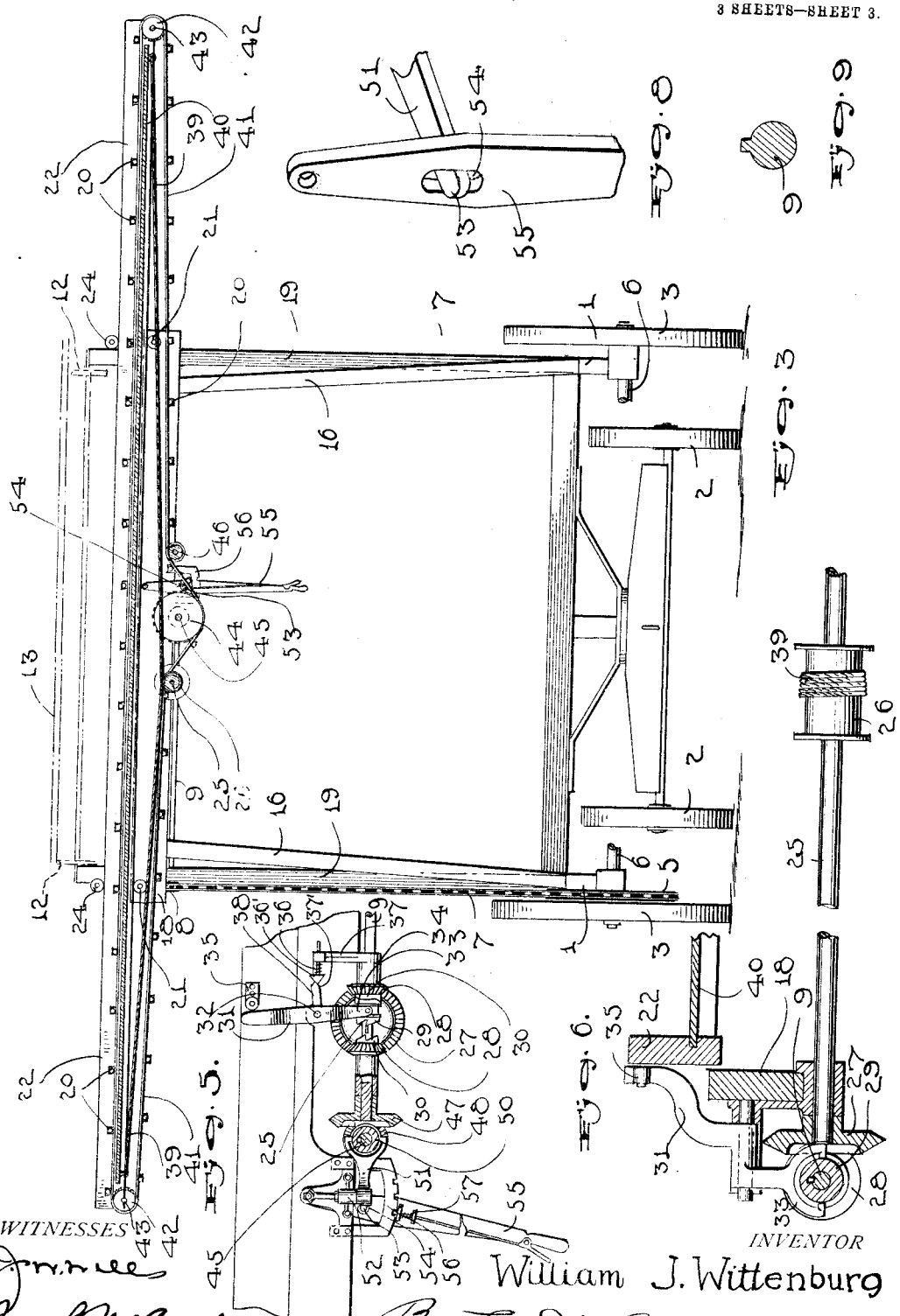

WILLIAM J. WITTENBURG, OF SALMON, IDAHO.

AUTOMATIC HAY-LOADER.

1,089,028.  Specification of Letters Patent.  Patented Mar. 3, 1914.

Application filed December 14, 1912. Serial No. 736,827.

*To all whom it may concern:*

Be it known that I, WILLIAM J. WITTENBURG, a citizen of the United States, residing at Salmon, in the county of Lemhi and State of Idaho, have invented certain new and useful Improvements in Automatic Hay-Loaders, of which the following is a specification, reference being had therein to the accompanying drawing.

This invention relates to hay loading devices and has for its object the production of an efficient hay loader which will distribute the hay upon the wagon adapted to receive the same in such a manner as to eliminate the necessity of having someone employed to evenly distribute the hay upon the body of the wagon.

Another object of the invention is the production of a simple and efficient automatic reversing means which will cause the distributing conveyer to be shifted laterally relative to the lifting apron so as to evenly distribute the hay upon the body of the wagon.

With these and other objects in view, this invention consists of certain novel constructions, combinations and arrangements of parts, as will be hereinafter fully described and claimed.

In the drawings:—Figure 1 is a side elevation partly in section of the hay lifting and loading device. Fig. 2 is a top plan view thereof partly broken away to show the operating parts. Fig. 3 is a section taken on line 3—3 of Fig. 2. Fig. 4 is an enlarged top plan view of the clutch mechanism for automatically causing the distributing conveyer frame to shift laterally and the clutch mechanism for changing the direction of travel of the conveyer distributing belt. Fig. 5 is an enlarged side elevation partly in elevation of the clutch mechanism for changing the travel of the distributing belt and also changing the travel of the frame adapted to carry the distributing belt. Fig. 6 is a fragmentary sectional view taken transversely through a portion of the frame for the conveyer distributing belt showing the automatic shaft lever in side elevation. Fig. 7 is a fragmentary sectional view through the clutch mechanism for changing the direction of travel of the distributing belt. Fig. 8 is a detail perspective of a portion of the lever adapted to change the direction of travel of the distributing belt showing the manner in which the operating bell crank engages said lever. Fig. 9 is a transverse section through the clutch supporting shaft showing the key portion formed thereon for keying the sliding clutch to the shaft. Fig. 10 is a detail perspective of the bell crank lever adapted to throw the clutch for changing the direction of travel of the distributing conveyer belt.

Referring to the drawings by numerals it will be seen that 1 designates the supporting frame of the hay distributing and lifting device which is supported upon the usual steering wheels 2 and the drive wheels 3. A draft tongue 4 is connected to the axle which supports the steering wheels 2 and to this tongue may be secured the draft animals for drawing the frame 1 in the direction of the arrow. Of course, the draft animals are so attached to the machine as to draw the same forward. A driving sprocket 5 is carried by the drive axle 6 and over this sprocket 5 passes a drive chain 7 which chain also passes over a sprocket wheel 8 adapted to drive the distributing operating shaft 9. A plurality of sprocket wheels 10 are supported upon the axle 6 upon the inside of the frame as indicated in Fig. 2, and conveyer chains 11 pass therethrough and also travel over the pulleys or sprocket wheels 12 carried by the upper end of the frame 1. This conveyer belt or apron comprises a plurality of transversely extending cleats 13 of the ordinary construction for lifting the hay or other material in the usual manner. The usual hay lifting or picking roller 14 is drawn in the rear of the machine by means of the arms 15 and raises the hay upon the conveyer apron carried by the chains 11.

The frame 1 is provided with a plurality of forwardly extending braces or beams 16 which support the front transversely extending beams 17 of the distributing frame. A rearward transversely extending beam 18 is secured to the vertically extending members 19 of the frame 1. An auxiliary sliding frame 20 is slidably mounted upon the main distributing frame and rollers 21 are supported by the transversely extending members 17 and 18 upon which rest the side members 22 of the auxiliary sliding frame 20. Brackets 23 are also carried by the side members 22 and carry rollers 24 working upon the upper edge of the side members 22. It will, therefore, be seen that these rollers 21 and 24 will constitute an efficient means for guiding the sliding frame 20. A drum supporting shaft 25 is supported upon the main distributing frame and carries a winding drum 26. This shaft 25 carries at its outer end a gear wheel 27 which gear wheel meshes with the gears 28 which gears 28 are loosely mounted upon the clutch shaft 9. A clutch 29 is slidably mounted upon the shaft 9 and is keyed thereto so as to rotate therewith. Clutch teeth 30 are formed upon the respective gears 28 and this clutch 29 is adapted to be shifted so as to contact with one of the clutch teeth 30 whereby rotary movement will be imparted to the shaft 25 through one of the gears 28 and the gear 27. This clutch 29 is operated by means of an automatic lever 31 which lever is pivotally secured to the main frame of the distributing frame at a pivot point 32. The clutch lever 31 is provided with a fork-shaped lower end 33 so as to straddle the clutch 29 and efficiently operate the same. This shaft 9 is supported in its correct position by means of brackets 34 carried by the main distributing frame.

A plurality of buffer rollers 35 are carried by the auxiliary sliding frame 20 of the distributing frame, at predetermined points so as to have the upper end of the automatic shifting lever 31 contact therewith whereby the lever will be swung to throw the clutch 29 into operative engagement with one of the gears 28. A buffer roller 35 is preferably carried near each end of the sliding frame 20 and this will cause the lever 31 to be efficiently swung after the sliding frame travels from one end of the main distributing frame to the other. A spring pressed catch 36 is supported upon an outwardly extending arm 37 carried by one of the brackets 34 and is adapted to be engaged by a projecting finger 38 of the lever 31 so as to constitute a catch for holding the lever 31 in a set position. This catch comprises an enlarged arrow-shaped head 36' which engages the pointed end 37' of the finger 38. It will, therefore, be seen that this spring pressed catch will efficiently hold the lever 31 in a set position until again operated upon by the next succeeding buffer roller 35. It should be understood that as soon as the auxiliary sliding frame of the distributing frame reaches one end of the main frame the lever 31 will engage one of the buffer rollers so that the same may be swung to the opposite position and throw the clutch 29 in engagement with the opposite gear 28 thereby causing the shaft 25 to operate in the opposite direction. A cable 39 is wound upon the drum 26 and has its opposite ends secured to the opposite ends of the sliding distributing frame. It will, therefore, be seen that as the shaft 25 rotates in one direction the sliding distributing frame will be moved toward one side of the machine whereas when the clutch 29 is thrown so as to engage the opposite gear from the one with which it has already been engaged, the sliding frame will be shifted to the opposite direction.

By means of the operation just described it will be seen that the hay will be evenly distributed across the width of the wagon adapted to travel to the side of the hay distributing frame thereby doing away with the necessity of employing an additional laborer to distribute the hay in the wagon after the same has once been dumped therein. It will also be seen through the automatic operating mechanism just described that the distributing frame will automatically reverse itself so as to allow the machine to efficiently operate without the necessity of manually shifting the distributing frame. Of course, it should be understood that the buffer rollers 35 may be detachably secured to the frame 20 so as to allow the same to be placed in different positions to accommodate the different width of wagons. Of course, it should be understood that after the wagon upon one side of the machine has been loaded a second wagon is drawn up on the opposite side of the machine and the operating mechanism for the conveyer distributing belt is so operated through the means hereinafter described, as to cause the conveyer distributing belt to operate in the opposite direction.

A conveyer belt 40 is carried by the auxiliary sliding frame 20 and by the sprocket chains 41 which sprocket chains pass over the sprocket wheels 42 carried by the shafts 43. A driving sprocket 44 is supported upon a driving shaft 45 and these chains 41 pass under this sprocket so as to cause the apron 40 to operate. Guide rollers 46 are carried by the main distributing frame and the conveyer belt 40 and chains 41 pass thereover so as to constitute means for holding the chains 41 in engagement with the driving sprocket 44.

A gear wheel 47 is carried by the inner end of the shaft 9 and this gear wheel meshes with the two loosely mounted gear wheels 48 positioned upon opposite sides of the gear. These gears 48 are supported upon the drive shaft 45 and carry clutch teeth 49. A clutch member 50 is slidably mounted upon the shaft between the gears 48 and is keyed thereto so as to rotate therewith. This clutch member is adapted to be thrown into engagement with the clutch teeth formed upon one of the gears 48 so as to lock one of the gears with the shaft 45 and impart rotary movement to the shaft 45 through the medium of the gear 47. Of course, it should be understood that when the clutch member 50 is thrown into operative engagement with the opposite gear the direction of travel of the shaft 45 will be changed. A bell crank lever 51 engages the clutch member 50 and is pivotally supported upon a bracket 52 which bracket 52 is secured to the stationary or main distributing frame. The bell crank lever 51 is provided with a forwardly extending end 53 which forwardly extending end fits in an aperture 54 formed in the clutch throwing lever 55. This clutch throwing lever 55 is pivotally secured to the stationary or main distributing frame at its upper end and depends from this frame so as to allow the same to be easily swung by the operator of the machine. A quadrant 56 is suspended from the main distributing frame and is adapted to be engaged by the usual spring clutch device 57 carried by the lever 55 for holding the lever in a set or operative position.

From the foregoing description it will be seen that a very efficient throwing mechanism has been produced whereby the direction of travel of the apron may be efficiently and quickly changed by throwing the lever 55. It should, however, be understood that the automatic clutch mechanism above described with reference to the reciprocating motion of the sliding frame upon the main frame, will at all times be the same.

From the foregoing description, it will be seen that a very efficient device has been produced which will distribute the hay upon the body of the wagon owing to the fact that the distributing frame is reciprocably mounted upon the main frame and is provided with automatic means for changing the direction of travel of the frame. It should also be understood that a very efficient device has been produced for changing the direction of travel of the apron carried by the distributing frame whereby a wagon may be loaded upon either side of the machine.

Having thus described the invention, what is claimed as new, is:—

1. In a machine of the class described the combination with a main frame, elevating means carried by said frame, a distributing frame reciprocably mounted upon said main frame and means for automatically shifting the distributing frame when it reaches the limits of its movement in one direction.

2. In a machine of the class described the combination with a main frame, elevating means carried by said main frame, a distributing frame reciprocably mounted upon said main frame, and automatic means cooperating therewith for causing the same to automatically shift back and forth upon said main frame.

3. In a machine of the class described the combination with a main frame, hay elevating means carried thereby, a distributing frame extending transversely of said main frame, a drum carried by said main frame, means for driving said drum, and means carried by said main frame and cooperating with said drum and driving means for causing said distributing frame to be automatically shifted from one side of said main frame to the other.

4. In a machine of the class described the combination with a main frame, of a distributing frame carried thereby, a drum carried by said main frame, cables passing over said drum and secured to the opposite ends of said distributing frame, driving means carried by said main frame, and automatic clutch means associated with said driving means and drum for automatically shifting said distributing frame from one side of said main frame to the other.

5. In a machine of the class described the combination with a main frame, of a distributing frame carried thereby, a drum carried by said main frame, a conveyer apron carried by said distributing frame, a driving shaft, of a clutch carried by said driving shaft, means cooperating with said driving shaft for imparting rotary movement to said drum, a lever carried by said clutch, and means carried by said main frame for swinging said lever whereby said clutch will be shifted and said distributing frame will be caused to travel in an opposite direction.

6. In a machine of the class described the combination with a frame, elevating means carried by said frame, of a hay distributing frame extending transversely of said main frame, a conveyer belt carried by said hay distributing frame, a cable secured to said main frame and having its opposite ends secured to the respective ends of said distributing frame, a drive gear associated with said drum, a drive shaft carried by said main frame, gears loosely mounted upon said drive shaft, a clutch keyed to said drive shaft, and means cooperating with said clutch for automatically shifting the same upon said drive shaft whereby said clutch member will be thrown into and out of engagement with said loosely mounted gears for changing the direction of travel of said distributing frame.

7. In a machine of the class described the combination with a main frame, elevating means carried thereby, of a distributing frame carried by said main frame, a drive shaft carried by said main frame, gears loosely mounted upon said main shaft, a clutch member keyed to said main shaft and slidably mounted thereon, a lever secured to said clutch, buffer rollers carried by said distributing frame and adapted to contact with said lever for shifting said clutch upon said drive shaft, means carried by said frame and coöperating with said distributing frame for imparting a reciprocating motion thereto, and means carried thereby and coöperating with said clutch means for imparting rotary movement thereto.

8. In a machine of the class described the combination with a main frame, of a reciprocating hay distributing frame carried thereby, a conveyer belt carried by said hay distributing frame, means for driving said conveyer belt, automatically acting means controlling the movements of the distributing frame, and manually operating means carried by said frame for changing the direction of travel of said conveyer belt.

9. In a machine of the class described the combination with a main frame, of a distributing frame carried thereby, a conveyer belt carried by said distributing frame, a main drive shaft, a gear carried by said main drive shaft, a driving shaft for said conveyer belt, gears loosely mounted upon said last mentioned driving shaft, a clutch slidably mounted between said gears and adapted to alternately lock said gears with said last mentioned driving shaft, a bell crank lever coöperating with said clutch for sliding the same upon said driving shaft, and an operating lever coöperating with said bell crank lever for causing said bell crank lever to be swung.

10. In a machine of the class described the combination with a main frame, of a distributing frame slidably mounted thereon, a conveyer belt carried by said distributing frame, means for imparting movement to said conveyer belt, means for reciprocating said distributing frame upon said main frame, a lever coöperating with said last mentioned means, and a buffer engaging said lever for resisting the swinging movement of said lever as the same is operated.

11. In a machine of the class described the combination with a main frame, a track extending transversely thereof, brackets secured to said track, rollers secured to said track and brackets, a sliding distributing frame carried by said rollers, and means automatically acting secured to said sliding frame for reciprocating the same upon said main frame.

12. In a machine of the class described the combination with a main frame, of a distributing frame slidably mounted thereon, means for driving said frame, clutch means coöperating with said last mentioned means, an operating lever coöperating with said clutch means, said operating lever provided with a laterally extending finger, a spring pressed plunger adapted to normally engage said finger for holding said lever in a set position, and said plungers adapted to yield as said lever strikes as obstruction for allowing said lever to be swung to operate said clutch.

In testimony whereof I hereunto affix my signature in presence of two witnesses.

WILLIAM J. WITTENBURG.

Witnesses:
ALLEN C. MERRITT,
JOHN T. WATKINS.

---

Copies of this patent may be obtained for five cents each, by addressing the "Commissioner of Patents, Washington, D. C."